United States Patent
Kim et al.

(10) Patent No.: US 11,204,776 B2
(45) Date of Patent: Dec. 21, 2021

(54) APPARATUS AND METHOD FOR BOOTING VIRTUAL MACHINES

(71) Applicant: Electronics and Telecommunications Research Institute, Daejeon (KR)

(72) Inventors: Sung-Jin Kim, Daejeon (KR); Woomin Hwang, Daejeon (KR); Byung-Joon Kim, Daejeon (KR); Chul-Woo Lee, Daejeon (KR); Hyoung-Chun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 210 days.

(21) Appl. No.: 15/069,094

(22) Filed: Mar. 14, 2016

(65) Prior Publication Data
US 2017/0097828 A1   Apr. 6, 2017

(30) Foreign Application Priority Data

Oct. 1, 2015   (KR) .................. 10-2015-0138464
Oct. 27, 2015   (KR) .................. 10-2015-0149138

(51) Int. Cl.
*G06F 16/11* (2019.01)
*G06F 16/188* (2019.01)
(Continued)

(52) U.S. Cl.
CPC ........ *G06F 9/4406* (2013.01); *G06F 9/45558* (2013.01); *G06F 16/11* (2019.01);
(Continued)

(58) Field of Classification Search
CPC ............... G06F 9/4406; G06F 17/3007; G06F 9/45558; G06F 17/30371; G06F 17/30233; G06F 2009/45575
See application file for complete search history.

(56) References Cited

U.S. PATENT DOCUMENTS

| 7,937,575 | B2 | 5/2011 | Hajji et al. |
| 8,176,336 | B1 * | 5/2012 | Mao ................ H04L 9/006 |
| | | | 713/189 |

(Continued)

FOREIGN PATENT DOCUMENTS

| JP | 2006-172376 A | 6/2006 |
| JP | 2014-522070 A | 8/2014 |

(Continued)

OTHER PUBLICATIONS

Berger, S. et al., "vTPM: Virtualizing the Trusted Platform Module," Proceedings of the 15th conference on USENIX Security Symposium, 16 pages (2006).

*Primary Examiner* — Henry Tsang
*Assistant Examiner* — Suman Debnath
(74) *Attorney, Agent, or Firm* — Nelson Mullins Riley & Scarborough LLP; Anthony A. Laurentano

(57) ABSTRACT

Disclosed herein are an apparatus and method for booting a virtual machine. The apparatus for booting a virtual machine includes: an access unit for accessing a virtual disk, corresponding to a virtual machine that exists in a virtualization area, using a trap generated by a trap generation unit, and for controlling the input and output of data stored in the virtual disk; an extraction unit for extracting data used for booting from the virtual disk; and a verification unit for extracting a trusted boot image from image storage and verifying the integrity of the data used for booting based on a result of comparing the trusted boot image with the data used for booting.

11 Claims, 4 Drawing Sheets

(51) Int. Cl.
  *G06F 16/23*   (2019.01)
  *G06F 9/455*   (2018.01)
  *G06F 9/4401*  (2018.01)

(52) U.S. Cl.
  CPC ........ *G06F 16/188* (2019.01); *G06F 16/2365* (2019.01); *G06F 2009/45575* (2013.01)

(56) References Cited

U.S. PATENT DOCUMENTS

| | | | |
|---|---|---|---|
| 9,667,414 B1* | 5/2017 | Brandwine | H04L 9/0819 |
| 9,792,143 B1* | 10/2017 | Potlapally | G06F 9/45558 |
| 2003/0084285 A1* | 5/2003 | Cromer | G06F 21/554 |
| | | | 713/164 |
| 2010/0070800 A1* | 3/2010 | Hanna | G06F 11/14 |
| | | | 714/6 |
| 2013/0151831 A1* | 6/2013 | Bealkowski | G06F 9/45533 |
| | | | 713/2 |
| 2016/0063253 A1 | 3/2016 | Tabone et al. | |
| 2016/0224789 A1* | 8/2016 | Feroz | G06F 21/566 |

FOREIGN PATENT DOCUMENTS

| | | |
|---|---|---|
| KR | 10-2010-0026195 A | 3/2010 |
| KR | 10-2014-0132296 A | 11/2014 |

\* cited by examiner

APPARATUS AND METHOD FOR BOOTING VIRTUAL MACHINES

CROSS REFERENCE TO RELATED APPLICATIONS

This application claims the benefit of Korean Patent Application No. 10-2015-0138464, filed Oct. 1, 2015, and No. 10-2015-0149138, filed Oct. 27, 2015, which are hereby incorporated by reference in their entirety into this application.

BACKGROUND OF THE INVENTION

1. Technical Field

The present invention generally relates to a technique for booting a virtual machine in a virtualization environment. More particularly, the present invention relates to a technique for verifying the integrity of files used for booting and the integrity of the sequence in which the files are loaded and booting a virtual machine using the verification result.

2. Description of the Related Art

Virtualization technology is technology for running multiple virtual desktops on a host server, based on a hypervisor such as VMware, Xen, or KVM, and is being actively researched because it has advantages of dramatically improving the availability of resources and reducing management costs.

A hypervisor is a logical platform for running multiple operating systems on a host computer.

Recently, following the threat of a kernel-mode rootkit, a bootkit has appeared. A bootkit plants a malicious payload on a system before the security system of the operating system starts working, and different kinds of bootkits have been emerging. In order to respond to the threat of a bootkit, operating systems have added security mechanisms that serve to check and recover boot components. However, because the weak points of operating system kernels are still exposed and a bootkit runs with kernel-mode privileges, which are the same as those of the security mechanism of the operating system, it is impossible to fundamentally prevent the bootkit threat. In a cloud computing environment, because a hypervisor or a virtualization host, which manages all virtualized resources, has privileges that are higher than the kernel-mode privileges of a virtual machine, the hypervisor or the virtualization host may become a root-of-trust, capable of safely executing security tasks.

Currently, as a method for achieving the reliability of a virtual machine platform, remote attestation may be performed using a vTPM, which virtualizes a Trusted Platform Module (TPM). The functions of the vTPM are similar to those of a hardware TPM, and verify both the boot sequence and boot components by sequentially performing hash computations on boot binaries in order to evaluate the boot process. However, the vTPM is intended to faithfully virtualize a hardware TPM into software, and does not execute any additional security task for a trusted boot, such as recovery from tampering.

U.S. Pat. No. 8,176,336 discloses technology in which a hypervisor is used as a root-of-trust, and a TPM is implemented as software on the hypervisor. However, U.S. Pat. No. 8,176,336 discloses only technology for verifying integrity when a virtual machine is booted, and does not mention any configuration for restoring corrupt files.

Therefore, as technology based on virtualization has been emerging and increasing, technology for stably booting a virtual machine, which is essential in a virtualization environment, is necessary.

SUMMARY OF THE INVENTION

An object of the present invention is to verify the integrity of boot components using access privileges that are higher than those of a virtual machine.

Another object of the present invention is to verify the integrity of boot components shortly before a virtual machine is booted.

A further object of the present invention is to restore a corrupt file when such a corrupt file is detected as the result of the integrity verification.

In order to accomplish the above object, an apparatus for booting a virtual machine includes: an access unit for accessing a virtual disk corresponding to a virtual machine that exists in a virtualization area and controlling input and output of data stored in the virtual disk, using a trap generated by a trap generation unit; an extraction unit for extracting data used for booting from the virtual disk; and a verification unit for extracting a trusted boot image from image storage and verifying integrity of the data used for booting based on a result of comparing the trusted boot image with the data used for booting.

The access unit may access the virtual disk after temporarily interrupting a boot of the virtual machine using the trap.

The access unit may access the virtual disk using an access privilege that has a higher level than an access privilege with which the virtual machine is allowed to access the virtual disk.

The access unit may access the virtual disk using an access privilege that is used by any one of a hypervisor corresponding to the virtual machine and a virtualization host corresponding to the virtual machine.

The data used for booting may include files used for booting the virtual machine and data about a sequence in which the files are loaded.

The verification unit may verify the integrity by checking whether the files used for booting the virtual machine are identical to files used for booting, stored in the trusted boot image, through comparison.

The verification unit may verify the integrity by checking whether the data about the sequence in which the files are loaded are identical to data about a loading sequence, stored in the trusted boot image, through comparison.

The apparatus for booting a virtual machine may further include a boot image restoration unit for determining whether the data used for booting has been forged based on a result of verifying the integrity, and restoring the data used for booting using the trusted boot image stored in the image storage when it is determined that the data used for booting has been forged.

The image storage may update the trusted boot image using update information that includes a list of boot components updated in the virtual machine.

The update information may be transmitted by a secure virtual machine (VM) that exists in the virtualization area.

Also, a method for booting a virtual machine according to an embodiment of the present invention includes: accessing a virtual disk, corresponding to a virtual machine that exists in a virtualization area, using a trap generated by a trap generation unit; extracting data used for booting from the virtual disk; and extracting a trusted boot image from image storage and verifying integrity of the data used for booting based on a result of comparing the trusted boot image with the data used for booting.

Accessing the virtual disk may be configured to generate the trap when the virtual machine boots, and to interrupt an operation of the virtual machine using the trap and access the virtual disk.

Accessing the virtual disk may be configured to access the virtual disk using an access privilege that has a higher level than an access privilege with which the virtual machine is allowed to access the virtual disk.

Accessing the virtual disk may be configured to access the virtual disk using an access privilege that is used by any one of a hypervisor corresponding to the virtual machine and a virtualization host corresponding to the virtual machine.

The data used for booting may include files used for booting the virtual machine and data about a sequence in which the files are loaded.

Verifying the integrity may be configured to verify the integrity by checking whether the files used for booting the virtual machine are identical to files used for booting, stored in the trusted boot image, through comparison.

Verifying the integrity may be configured to verify the integrity by checking whether the data about the sequence in which the files are loaded are identical to data about a loading sequence, stored in the trusted boot image, through comparison.

The method for booting a virtual machine may further include determining whether the data used for booting has been forged based on a result of verifying the integrity, and restoring the data used for booting using the trusted boot image stored in the image storage when it is determined that the data used for booting has been forged.

The image storage may update the trusted boot image using update information that includes a list of boot components updated in the virtual machine.

The update information may be transmitted by a secure virtual machine (VM) that exists in the virtualization area.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
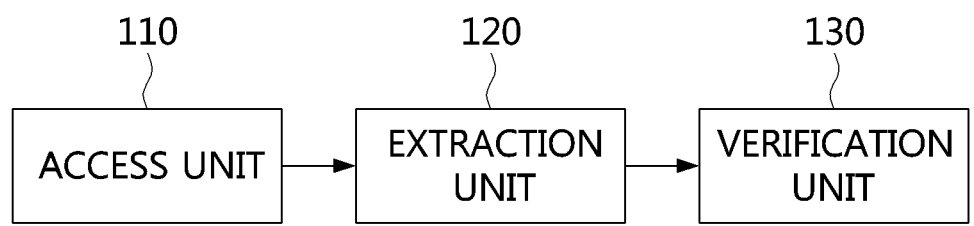
FIG. 1 is a block diagram illustrating an apparatus for booting a virtual machine according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a block diagram illustrating an apparatus for booting a virtual machine according to an embodiment of the present invention.

Referring to FIG. 1, the apparatus for booting a virtual machine according to an embodiment of the present invention includes an access unit 110, an extraction unit 120, and a verification unit 130.

When a trap occurs, the access unit 110 accesses a virtual disk corresponding to a virtual machine that exists in a virtualization area, and controls the input and output of data stored in the virtual disk.

In this case, the trap serves to temporarily interrupt the operation of the virtual machine when the virtual machine boots.

The trap may be generated by a trap generation unit (not illustrated).

The trap may be generated synchronously or asynchronously with the operation of the virtual machine.

Because the trap is executed before the virtual machine boots, the apparatus for booting the virtual machine may verify the integrity of boot components before the virtual machine has booted.

Also, the access unit 110 may access the virtual disk using privileges that are higher than the privileges with which the virtual machine accesses the virtual disk.

For example, the access unit 110 may access the virtual disk using the access privileges of the hypervisor or virtualization host corresponding to the virtual machine. Accordingly, the access unit may access the virtual disk regardless of the context of the operating system installed in the virtual machine. Also, even if malicious code prevents the operating system of a virtual machine from accessing the virtual disk, the access unit 110 may access the virtual disk, and it is difficult for the malicious code to tamper with the result of the access.

The extraction unit 120 extracts data about boot information from the virtual disk.

In this case, the data about boot information may include a list of files used for booting and data about the sequence in which the files are loaded.

Here, the files used for booting may include binaries for running BIOS, binaries for running firmware, a boot record, an operating system loader, and an operating system kernel driver.

Here, data about the sequence in which the files are loaded may be extracted using information about the sequence in which boot components are loaded, which is recorded in the configuration file of the operating system corresponding to the virtual machine.

The verification unit 130 extracts a trusted boot image from image storage, and verifies the integrity of the data about boot information based on the result of comparing the trusted boot image with the data about boot information.

Here, the trusted boot image guarantees the integrity of booting.

Specifically, the trusted boot image includes files used for booting, the integrity of which is guaranteed, and data about the sequence in which the files are loaded.

When malicious code is planted on a virtual machine, the malicious code tampers with the files used for booting the virtual machine or the sequence in which the files are loaded. In order to detect tampering, the verification unit 130 compares the trusted boot image, the integrity of which is guaranteed, with the data about boot information, which is stored in the virtual disk.

In this case, the verification unit 130 compares a list of files used for booting the virtual machine (the list being extracted from the virtual disk) with a list of files used for booting, which is stored in the trusted boot image, and verifies integrity by checking whether the two lists are the same as each other.

In this case, the hash value of the files extracted from the virtual disk is computed and compared with a hash value of the files used for booting, which is stored in the trusted boot image, whereby the integrity may be verified.

Also, the verification unit 130 compares the data about the sequence in which the files are loaded (the data being extracted from the virtual disk) with the data about the sequence in which boot components are loaded, which is stored in the trusted boot image, and verifies the integrity by checking whether the two data are the same as each other.

In this case, the integrity may be verified by comparing the hash value of the data about the sequence in which the files are loaded with a hash value of the data about the sequence in which the boot components are loaded.

Although not illustrated in FIG. 1, the apparatus for booting a virtual machine according to an embodiment of the present invention may further include a boot image restoration unit (not illustrated) for replacing corrupt booting components or a corrupt loading sequence by the trusted boot image when it is determined, based on the result of the integrity verification, that either one of the boot components and the loading sequence has been forged.

In this case, after the boot components in the virtual machine are updated, the trusted boot image may be updated in the image storage using the updated information.

Here, the trusted boot image may be stored in the image storage in the form of plain text or in encrypted form.

In this case, the update may be implemented using an agent that exists in a separate Secure Virtual Machine (Secure VM), having the same operating system as the virtual machine. The agent may update the boot components of the virtual machine, either periodically or in real time, extract information about the update, and update the trusted boot image in the image storage based on the extracted information about the update.

In this case, after restoring the corrupt boot components or the corrupt loading sequence, or if it is determined that the boot components and the loading sequence have not been forged, the trap is disabled and booting may be normally performed. That is, the process flow changes from execution of the trap to the virtual machine booting process.

Figure 2:
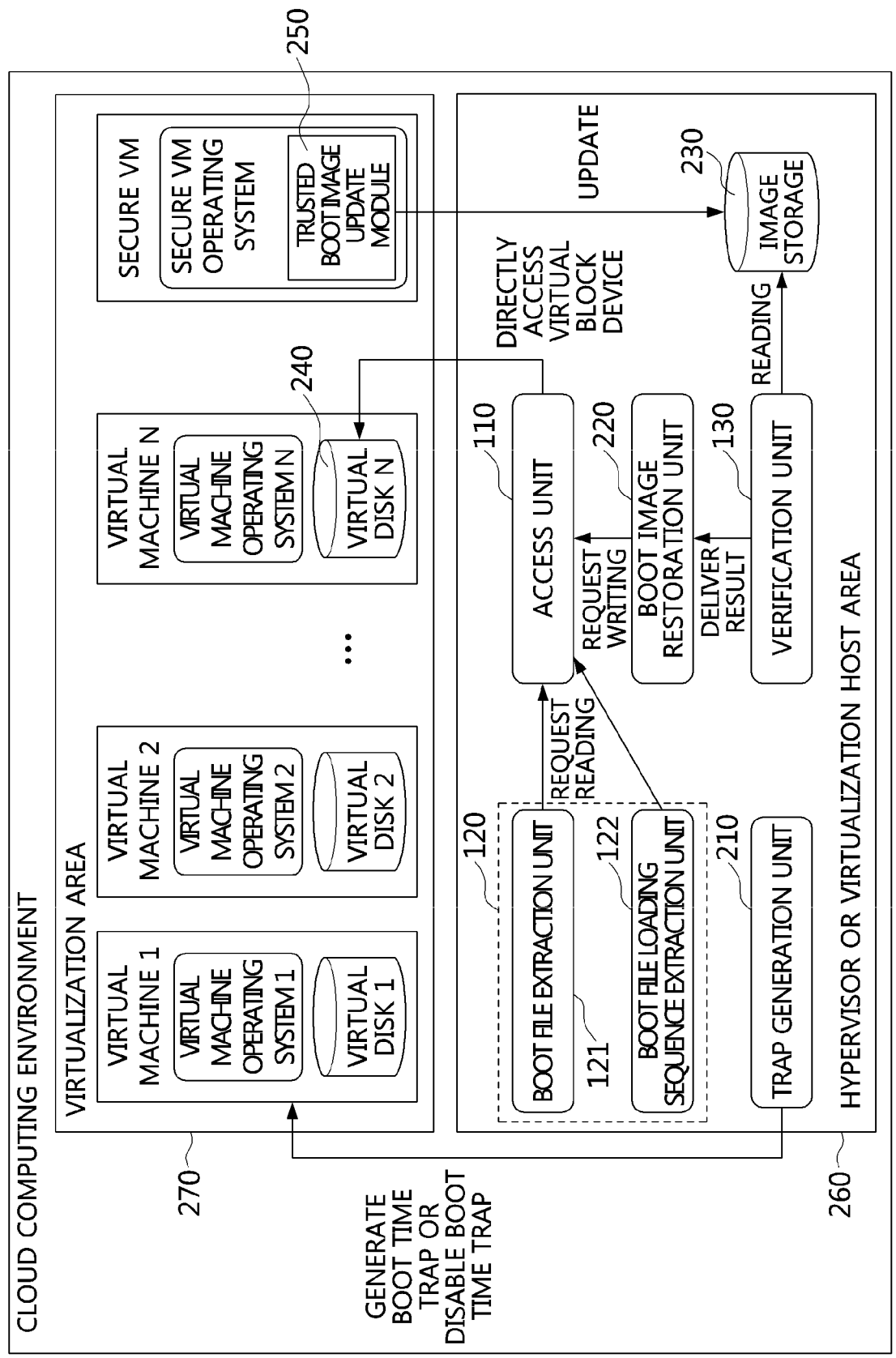
FIG. 2 is a view illustrating the operations of a virtual machine and an apparatus for booting the virtual machine according to an embodiment of the present invention.

FIG. 2 is a view illustrating the operations of a virtual machine and an apparatus for booting a virtual machine according to an embodiment of the present invention.

FIG. 2 illustrates the operations of the virtual machine and the apparatus for booting the virtual machine based on the description of FIG. 1.

First, an access unit 110, an extraction unit 120, and a verification unit 130 exist in a hypervisor or a virtualization host area.

At this time, in order to access the boot image of a virtual machine, the access unit 110 directly access a virtual disk rather than requesting the operating system of the virtual machine to access the virtual disk.

This functions to use access privileges that are higher than the privileges with which the virtual machine accesses the virtual disk.

In the normal case, the privileges that the hypervisor or the virtualization host uses when accessing the virtual machine are higher than the access privileges granted to the virtual machine.

Consequently, in a cloud computing environment, because a hypervisor or a virtualization host manages all virtualization resources including virtual machines, it has higher privileges than the virtual machines, and thus becomes a root-of-trust for safely executing security tasks.

First, a trap generation unit 210 generates a trap shortly before a virtual machine is booted or rebooted.

In this case, the trap may temporarily interrupt the operation of booting the virtual machine, and because the trap is generated in the hypervisor or the virtualization host area, the virtual machine is not able to arbitrarily control the trap. In other words, malicious code planted on the virtual machine is not able to govern the generation of the trap.

One of the points of the present invention is that the access unit 110 accesses the virtual disk of the virtual machine and the extraction unit 120 extracts a list of boot files (that is, a list of boot components) and information about the sequence in which the files are loaded when the boot operation of a virtual machine is interrupted by the generated trap.

The verification unit 130 verifies the integrity of the list of boot files and information about the sequence in which the files are loaded using a trusted boot image stored in image storage 230.

As a result of the integrity verification, when it is determined that either one of the list of boot files and the information about the sequence in which the files are loaded has been forged, the trusted boot image stored in the image storage 230 is transmitted to the virtual disk and is written over the forged data, whereby the data may be restored to data of which the integrity is guaranteed. Consequently, the present invention may perform verified booting by recovering the boot file or the information about the sequence in which the files are loaded from tampering attributable to malicious code.

The conventional art determines the integrity of boot components during booting, but does not provide a process for restoring corrupt boot components, and thus booting proceeds with the corrupt boot components.

However, the present invention may restore corrupt components before booting and provide verified booting.

Figure 3:
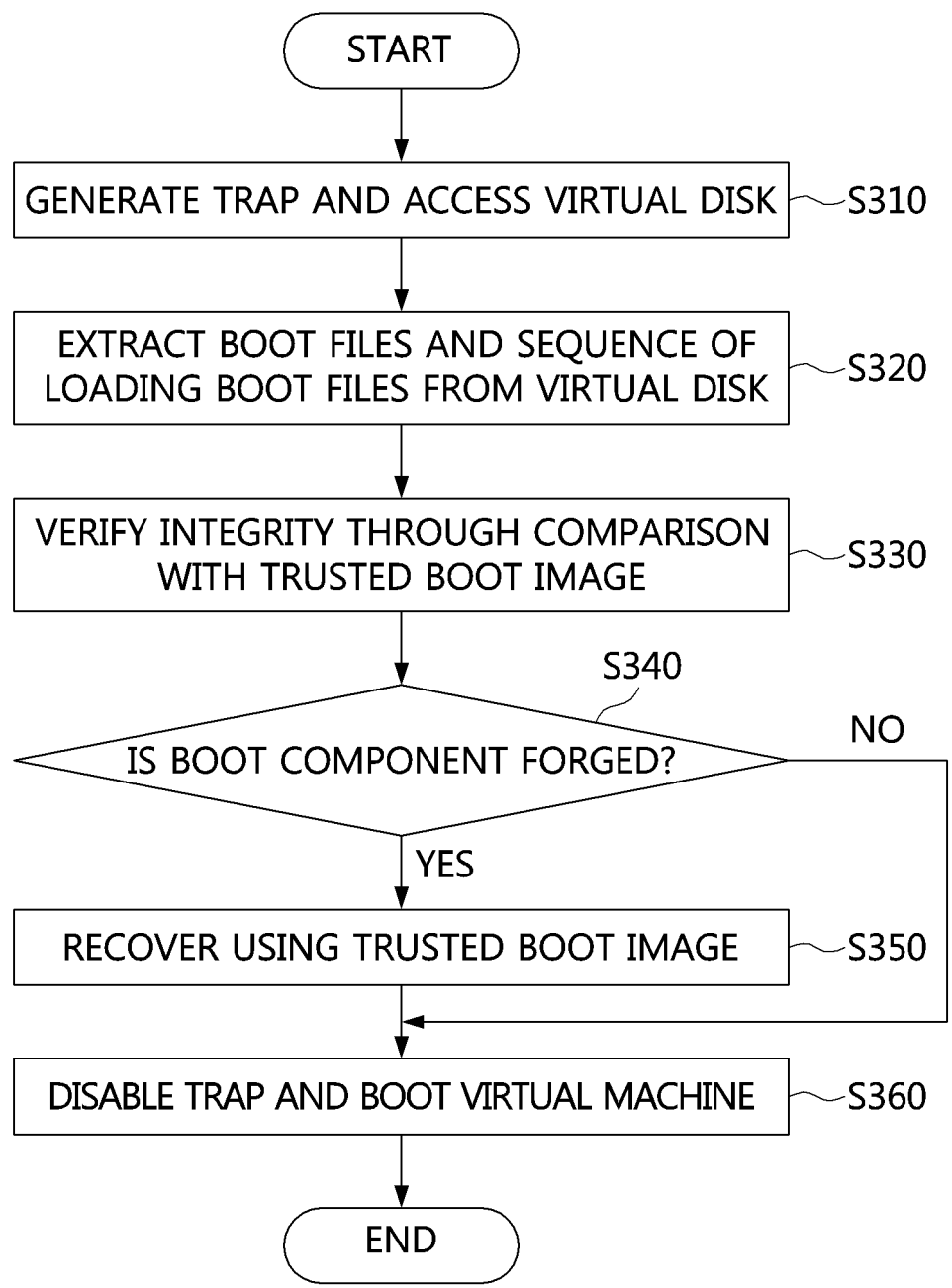
FIG. 3 is a flowchart illustrating a method for booting a virtual machine according to an embodiment of the present invention.

FIG. 3 is a flowchart illustrating a method for booting a virtual machine according to an embodiment of the present invention.

Referring to FIG. 3, first, a trap is generated and a virtual disk is accessed at step S310.

In this case, the trap serves to temporarily interrupt the operation of a virtual machine when the virtual machine boots.

In this case, the trap may be generated by a trap generation unit.

Because the trap is executed before the virtual machine boots, the apparatus for booting the virtual machine may verify the integrity of boot components before the virtual machine has booted.

Also, boot files and the sequence in which the boot files are loaded are extracted from the virtual disk at step S320.

In this case, data about boot information, stored in the virtual disk, may include a list of files used for booting and data about the sequence in which the files are loaded.

In this case, the files used for booting may include binaries for running BIOS, binaries for running firmware, a boot record, an operating system loader, and an operating system kernel driver.

In this case, the data about the sequence in which the files are loaded may be extracted using the data about the sequence in which boot components are loaded, which is recorded in the configuration file of the operating system corresponding to the virtual machine.

Subsequently, integrity is verified by comparing the boot information with a trusted boot image at step S330.

Here, the trusted boot image guarantees the integrity of booting.

Specifically, the trusted boot image includes boot files, of which the integrity is guaranteed, and data about the sequence in which the files are loaded.

When malicious code is planted on a virtual machine, the malicious code tampers with the files used for booting the virtual machine or the sequence in which the files are loaded. In order to detect such tampering, the verification unit 130 compares the trusted boot image, the integrity of which is guaranteed, with the boot information stored on the virtual disk.

In this case, the verification unit 130 compares the list of files used for booting the virtual machine (the list being extracted from the virtual disk) with a list of files used for booting, which is stored in the trusted boot image, and verifies integrity by checking whether the two lists are the same as each other.

In this case, the hash values of the files extracted from the virtual disk is computed and compared with a hash value of the files used for booting, which is stored in the trusted boot image, whereby the integrity may be verified.

Also, the verification unit 130 compares the data about the sequence in which the files are loaded (the data being extracted from the virtual disk) with the data about the sequence in which boot components are loaded, which is stored in the trusted boot image, and verifies the integrity by checking whether the two data are the same as each other.

In this case, the integrity may be verified by comparing the hash value of the data about the sequence in which the files are loaded with a hash value of the data about the sequence in which boot components are loaded.

Also, whether the boot components have been forged is determined at step S340 based on the result of the integrity verification.

If the boot components have been forged, recovery is performed using the trusted boot image stored in the image storage at step S350.

In this case, after the boot components in the virtual machine are updated, the trusted boot image may be updated in the image storage using the updated information.

Here, the trusted boot image may be stored in the image storage in the form of plain text or in encrypted form.

In this case, the update may be implemented using an agent that exists in a separate Secure Virtual Machine (Secure VM) having the same operating system as the virtual machine. The agent may update the boot components of the virtual machine, either periodically or in real time, extract information about the update, and update the trusted boot image in the image storage based on the extracted information about the update.

In this case, after restoring the corrupt boot components or the corrupt loading sequence, or if it is determined that the boot components and the loading sequence have not been forged, the trap is disabled and booting may be normally performed. That is, the process flow changes from execution of the trap to the virtual machine booting process.

In other words, when the restoration has been completed, or when the boot components have not been forged, the trap is disabled and booting proceeds at step S360.

Figure 4:
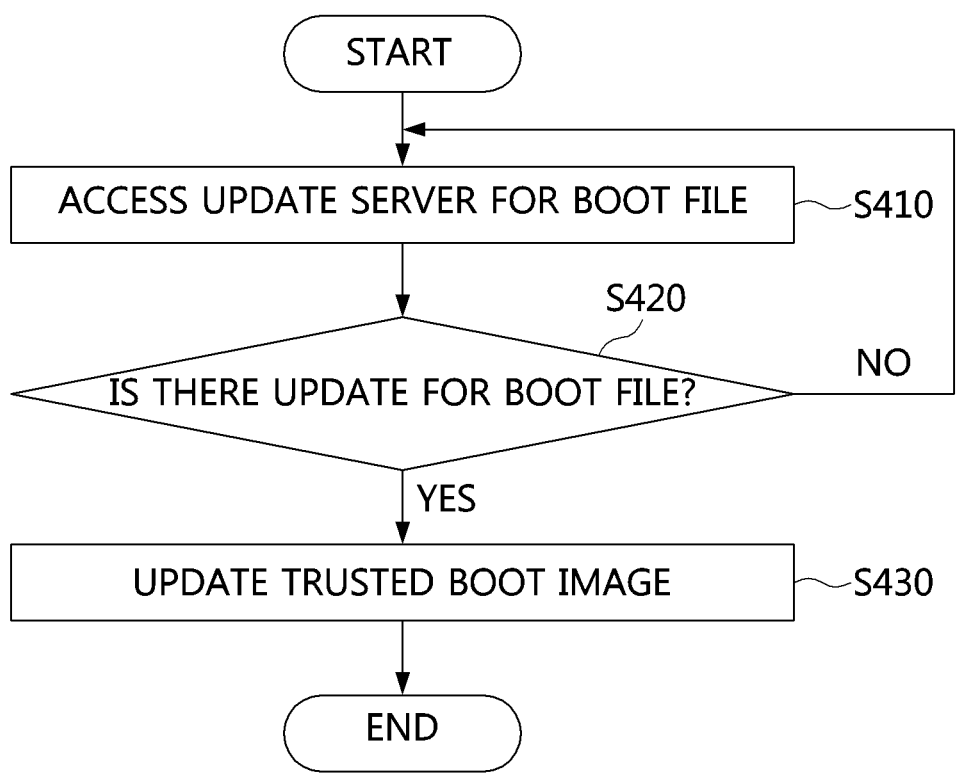
FIG. 4 is a flowchart illustrating a process of updating a trusted boot image, the process being used in the method for booting a virtual machine according to an embodiment of the present invention.

FIG. 4 is a flowchart illustrating the process for updating a trusted boot image, the process being used in the method for booting a virtual machine according to an embodiment of the present invention.

Referring to FIG. 4, first, an update server for a boot file is accessed at step S410.

At this time, the update server may be accessed either at predetermined intervals or in real time.

Also, it is determined at step S420 whether there is an update for the boot file, and when there is an update, a trusted boot image is updated at step S430.

The present invention may provide a more secure boot environment by verifying the files used for booting and the sequence in which the files are loaded in a hypervisor or a virtualization host area, which has access privileges that are higher than those of a virtual machine.

Also, because the present invention generates a trap shortly before a virtual machine is booted and verifies files used for booting and the sequence in which the files are loaded before the booting has been completed, the threat of a bootkit that causes malicious behavior may be fundamentally prevented.

Also, when there is a corrupt file, the present invention overwrites the corrupt file with a trusted boot image, the integrity of which is verified, before booting, whereby a more secure boot environment may be provided.

As described above, the apparatus and method for booting a virtual machine according to the present invention are not limitedly applied to the configurations and operations of the above-described embodiments, but all or some of the embodiments may be selectively combined and configured so that the embodiments may be modified in various ways.

What is claimed is:

1. An apparatus for booting a virtual machine, comprising:
    an access unit for accessing a virtual disk corresponding to a virtual machine that exists in a virtualization area and controlling input and output of data stored in the virtual disk, using a trap generated by a trap generation unit, wherein the access unit accesses the virtual disk using an access privilege that has a higher level than an access privilege with which the virtual machine is avowed to access the virtual disk;
    an extraction unit for extracting data used for booting from the virtual disk, wherein the data used for booting includes a plurality of files used for booting the virtual machine and data about a sequence in which the plurality of files are loaded;
    a verification unit for extracting a trusted boot image from a trusted boot image storage element, wherein the trusted boot image includes a plurality of files used for booting and data about a sequence in which the plurality of files are loaded, and verifying integrity of the data used for booting by comparing at once an entirety of the plurality of files of the trusted boot image with an entirety of the plurality of files used for booting the virtual machine, and if the entirety of the plurality of files used for booting the virtual machine are identical to the entirety of the plurality of files of the trusted boot image based on the comparison, then the integrity of the data is verified, wherein the verification unit verifies the integrity by checking whether the data about the sequence in which the plurality files are loaded from the virtual disk, is identical to the data about the sequence in which the plurality of files are loaded, stored in the trusted boot image, through comparison, a boot image restoration unit for determining whether the data used for booting the virtual machine has been forged based on a result of verifying the integrity, and restoring the data used for booting using the trusted boot image stored in the image storage element when it is determined that the data used for booting has been forged, a memory for storing information associated with the access unit, the extraction unit, the verification unit, and the boot image restoration unit, and a hardware processor for processing and executing the information associated with the access unit, the extraction unit, the verification unit, and the boot image restoration unit, wherein at least the access unit, the trap generation unit, the extraction unit, the trusted boot image storage element, and the verification unit form part of a hypervisor, and wherein the verification unit verifies the integrity by comparing a hash value of the data about the sequence in which the plurality of files are loaded from the virtual disk with a hash value of the data about the sequence in which the plurality of the files are loaded at the trusted boot image.

2. The apparatus of claim 1, wherein the access unit accesses the virtual disk after temporarily interrupting a boot of the virtual machine using the trap.

3. The apparatus of claim 1, wherein the access unit accesses the virtual disk using an access privilege that is used by any one of a hypervisor corresponding to the virtual machine and a virtualization host corresponding to the virtual machine.

4. The apparatus of claim 1, wherein the image storage updates the trusted boot image using update information that includes a list of boot components updated in the virtual machine.

5. The apparatus of claim 4, wherein the update information is transmitted by a secure virtual machine (VM) that exists in the virtualization area.

6. A method for booting a virtual machine, comprising:
accessing a virtual disk with an access unit, corresponding to a virtual machine that exists in a virtualization area, using a trap generated by a trap generation unit, wherein the access unit accesses the virtual disk using an access privilege that has a higher level than an access privilege with which the virtual machine is allowed to access the virtual disk;
extracting data used for booting from the virtual disk with an extraction unit, wherein the data used for booting includes a plurality of files used for booting the virtual machine and data about a sequence in which the plurality files are loaded;
extracting a trusted boot image from a trusted boot image storage element with a verification unit, wherein the trusted boot image includes a plurality of files used for booting and data about a sequence in which the files are loaded, and verifying integrity of the data used for booting by comparing at once an entirety of the plurality of files of the trusted boot image with an entirety of the plurality of files used for booting the virtual machine, and if the entirety of the plurality of files of the data used for booting the virtual machine are identical to the entirety of the plurality of files of the trusted image based on the comparison, then the integrity of the data is verified;
determining whether the data used for booting the virtual machine has been forged based on a result of verifying the integrity; and
restoring the data used for booting using the trusted boot image stored in the image storage when it is determined that the data used for booting has been forged,
wherein at least the access unit, the trap generation unit, the extraction unit, the trusted boot image storage element, and the verification unit form part of a hypervisor, and wherein the verification unit verifies the integrity by comparing a hash value of the data about the sequence in which the plurality of files are loaded from the virtual disk with a hash value of the data about the sequence in which the plurality of files are loaded of the trusted boot image.

7. The method of claim 6, wherein accessing the virtual disk is configured to:
generate the trap when the virtual machine boots; and
interrupt an operation of the virtual machine using the trap and access the virtual disk.

8. The method of claim 6, wherein accessing the virtual disk is configured to access the virtual disk using an access privilege that is used by any one of a hypervisor corresponding to the virtual machine and a virtualization host corresponding to the virtual machine.

9. The method of claim 6, wherein verifying the integrity is configured to verify the integrity by checking whether the data about the sequence in which the files are loaded is identical to data about a loading sequence, stored in the trusted boot image, through comparison.

10. The method of claim 6, wherein the image storage updates the trusted boot image using update information that includes a list of boot components updated in the virtual machine.

11. The method of claim 10, wherein the update information is transmitted by a secure virtual machine (VM) that exists in the virtualization area.

* * * * *